(12) United States Patent (10) Patent No.: US 12,623,571 B2
Park et al. (45) Date of Patent: May 12, 2026

(54) POWER CONTROL APPARATUS AND VEHICLE HAVING THE SAME

(71) Applicants: Hyundai Motor Company, Seoul (KR); Kia Corporation, Seoul (KR); Kyungshin Corp., Incheon (KR)

(72) Inventors: Sehoon Park, Yongin-si (KR); Hyunsock Yi, Incheon (KR)

(73) Assignees: Hyundai Motor Company, Seoul (KR); Kia Corporation, Seoul (KR); Kyungshin Corp., Incheon (KR)

( * ) Notice: Subject to any disclaimer, the term of this patent is extended or adjusted under 35 U.S.C. 154(b) by 285 days.

(21) Appl. No.: 18/363,983

(22) Filed: Aug. 2, 2023

(65) Prior Publication Data

US 2024/0123865 A1 Apr. 18, 2024

(30) Foreign Application Priority Data

Oct. 17, 2022 (KR) ........................ 10-2022-0133071

(51) Int. Cl.
| | |
|---|---|
| *B60L 58/20* | (2019.01) |
| *B60L 1/02* | (2006.01) |
| *B60L 58/12* | (2019.01) |
| *B60W 10/184* | (2012.01) |
| *B60W 10/20* | (2006.01) |
| *B60W 10/26* | (2006.01) |
| *B60W 60/00* | (2020.01) |

(52) U.S. Cl.
CPC ................. *B60L 58/20* (2019.02); *B60L 1/02* (2013.01); *B60L 58/12* (2019.02); *B60W 10/184* (2013.01); *B60W 10/20* (2013.01);

*B60W 10/26* (2013.01); *B60W 60/001* (2020.02); *B60L 2210/10* (2013.01); *B60W 2510/244* (2013.01)

(58) Field of Classification Search
None
See application file for complete search history.

(56) References Cited

U.S. PATENT DOCUMENTS

| | | | | |
|---|---|---|---|---|
| 10,052,967 | B2 * | 8/2018 | Saucke | B60L 8/003 |
| 11,126,176 | B2 * | 9/2021 | Sakamoto | G05D 1/0077 |
| 11,609,278 | B2 * | 3/2023 | Kwon | G01R 31/40 |
| 11,728,674 | B2 * | 8/2023 | Shibata | B60L 15/2045 307/64 |
| 11,843,241 | B2 * | 12/2023 | Yu | H02H 7/20 |
| 11,904,839 | B2 * | 2/2024 | Sakaguchi | B60W 50/038 |
| 11,914,001 | B2 * | 2/2024 | Kwon | G01R 31/54 |

(Continued)

FOREIGN PATENT DOCUMENTS

| | | |
|---|---|---|
| JP | 6675487 B2 | 4/2020 |
| JP | 2021054178 A | 4/2021 |

(Continued)

*Primary Examiner* — Jonathan M Dager
(74) *Attorney, Agent, or Firm* — Slater Matsil, LLP

(57) ABSTRACT

An embodiment power control apparatus includes a power converter configured to convert a voltage supplied from a first battery into a voltage lower than the voltage supplied from the first battery, a power distributor configured to distribute power supplied from the power converter and supply the distributed power to a braking device, a steering device, a sensor, and an autonomous driving control device in duplicate, and a battery management device configured to control a charging of a second battery using the power supplied from the power distributor.

20 Claims, 9 Drawing Sheets

(56)                References Cited

U.S. PATENT DOCUMENTS

| | | | | |
|---|---|---|---|---|
| 12,176,704 B2 * | 12/2024 | Hwang | B60R 16/033 | |
| 12,176,749 B2 * | 12/2024 | Lee | H02J 7/342 | |
| 12,224,581 B2 * | 2/2025 | Lee | H02J 7/00712 | |
| 2005/0002140 A1 * | 1/2005 | Borrego Bel | H02J 7/005 | |
| | | | | 361/62 |
| 2013/0342167 A1 * | 12/2013 | Bissontz | B60L 58/22 | |
| | | | | 320/118 |
| 2015/0298631 A1 * | 10/2015 | Belger | B60L 53/14 | |
| | | | | 307/10.1 |
| 2016/0129804 A1 * | 5/2016 | Matsubara | B60L 58/40 | |
| | | | | 320/134 |
| 2017/0297448 A1 * | 10/2017 | Sufrin-Disler | B60L 58/20 | |
| 2018/0001926 A1 * | 1/2018 | Swieter | B62D 5/046 | |
| 2018/0229609 A1 * | 8/2018 | Hudson | B60L 58/20 | |
| 2018/0334118 A1 * | 11/2018 | Masui | H02J 7/00 | |
| 2019/0077401 A1 * | 3/2019 | Katagiri | B60W 10/18 | |
| 2019/0299806 A1 * | 10/2019 | Oyama | H01M 10/425 | |
| 2020/0039527 A1 * | 2/2020 | Hase | B60W 30/12 | |
| 2020/0041558 A1 * | 2/2020 | Enslin | G01R 31/50 | |
| 2020/0079354 A1 * | 3/2020 | Damsaz | B60W 50/0097 | |
| 2020/0143609 A1 * | 5/2020 | Neelakantan | H02J 9/06 | |
| 2020/0324719 A1 * | 10/2020 | Mahmoud | H04L 12/10 | |
| 2020/0406869 A1 * | 12/2020 | Hwang | B60T 17/22 | |
| 2021/0009007 A1 * | 1/2021 | Day | B60L 58/20 | |
| 2021/0114469 A1 * | 4/2021 | Kim | B60L 50/75 | |
| 2021/0285997 A1 | 9/2021 | Jarmolowitz et al. | | |
| 2022/0063414 A1 * | 3/2022 | Kim | B60L 3/0084 | |
| 2022/0069605 A1 * | 3/2022 | Trela | G01R 31/392 | |
| 2022/0091193 A1 * | 3/2022 | Kwon | G01R 31/54 | |
| 2023/0134008 A1 * | 5/2023 | Jabez Dhinagar | H02J 7/0013 | |
| | | | | 320/107 |
| 2023/0166599 A1 * | 6/2023 | Hertzberg | B60L 53/14 | |
| | | | | 180/65.1 |
| 2024/0092177 A1 * | 3/2024 | Gerard | H01M 16/006 | |
| 2024/0124001 A1 * | 4/2024 | Park | B60W 50/0205 | |
| 2024/0154433 A1 * | 5/2024 | Kim | B60L 53/22 | |
| 2025/0135951 A1 * | 5/2025 | Loehnert | B60L 3/003 | |
| 2025/0206244 A1 * | 6/2025 | Hwang | B60R 16/033 | |

FOREIGN PATENT DOCUMENTS

| | | |
|---|---|---|
| KR | 20220026873 A | 3/2022 |
| KR | 20220039089 A | 3/2022 |

* cited by examiner

POWER CONTROL APPARATUS AND VEHICLE HAVING THE SAME

CROSS-REFERENCE TO RELATED APPLICATIONS

This application claims the benefit of Korean Patent Application No. 10-2022-0133071, filed on Oct. 17, 2022, which application is hereby incorporated herein by reference.

TECHNICAL FIELD

The present disclosure relates to a power control apparatus and a vehicle having the same.

BACKGROUND

Generally, vehicles include various electrical components for protecting occupants and providing convenience and fun to the occupants, one or more batteries for supplying power to the electrical components, and a generator for producing power and supplying the generated power to the electrical components and the one or more batteries.

Electrical components of a vehicle may be classified into high-power electrical components requiring high voltage, such as compressors and heaters for air conditioning, and low-power electrical components requiring low voltage, such as seat heating wires, steering wheel heating wires, and seat ventilators.

Batteries, like the classification of electrical components, may include a first battery for supplying high-voltage power to the high-power electrical components and a second battery for supplying low-voltage power to the low-power electrical components.

Furthermore, vehicles may further include a power converter for converting power from the first battery into low-voltage power and supplying the converted low-voltage power to the second battery and a divider for supplying power from the second battery to the low-power electric components.

Conventionally, vehicles experience difficulty in supplying power from the second battery to low-power electric components when a distributor fails, leading to stoppage of the operation of the low-power electric components.

For an autonomous vehicle, autonomous driving thereof is stopped when operation of electrical components fails. In particular, if the failed electric components are directly related to driving devices, such as an engine device, transmission device, braking device, and steering device of the vehicle, it may lead to a vehicle accident.

Vehicles known in the art have a disadvantage in recognizing a place where a power line is disconnected when operation of at least one of a plurality of electrical components fails.

SUMMARY

The present disclosure relates to a power control apparatus and a vehicle having the same. Particular embodiments relate to a power control apparatus for diagnosing disconnection of a power line and a vehicle having the same.

An embodiment of the disclosure provides a power control apparatus configured for supplying power to a steering device, a braking device, one or more sensors, and an autonomous driving control device in a dual manner, recognizing a disconnection point when at least one disconnection occurs among a plurality of power lines, and providing information on the recognized disconnection point to the autonomous driving control device, and a vehicle having the same.

Another embodiment of the disclosure provides a power control apparatus configured for supplying power from a second battery in response to a point where a power line is disconnected being a central control device, and a vehicle having the same.

Additional embodiments of the disclosure will be set forth in part in the description which follows and, in part, will be obvious from the description, or may be learned by practice of the disclosure.

In accordance with an embodiment of the disclosure, a power control apparatus includes a power converter configured to convert a voltage supplied from a first battery into a voltage lower than the voltage of the first battery, a power distributor configured to distribute power supplied from the power converter and supply the distributed power to a braking device, a steering device, one or more sensors, and an autonomous driving control device in duplicate, and a battery management device configured to control a charging of a second battery using the power supplied from the power distributor.

The power control apparatus may include a central control device configured to receive power from the power distributor and communicate with the power converter, the autonomous driving control device, and the power distributor. The power distributor may control the second battery to supply the power of the second battery to the central control device in response to a message not being received from the central control device.

The power distributor may control, while the power of the second battery is being supplied to the central control device, the second battery to cut off the power supply of the second battery in response to a message for power input of the power converter being received from the central control device.

The power distributor may determine, in response to a message for power non-input of the power distributor being received, that a disconnection has occurred in a power line between the power converter and the central control device and may transmit disconnection information regarding the power line between the power converter and the central control device to the autonomous driving control device.

The power distributor may monitor at least one of power, voltage, and current of the power converter, determine whether a power line between the power converter and the power distributor is disconnected based on the monitored information, and transmit, in response to the power line between the power converter and the power distributor being disconnected, disconnection information on the power line between the power converter and the power distributor to the autonomous driving control device.

The power distributor may include a first distributor connected to the power converter, a second distributor connected to the first distributor and configured to supply the power to the braking device, the steering device, the one or more sensors, and the autonomous driving control device, and a third distributor connected to the second distributor and configured to supply the power to the braking device, the steering device, the one or more sensors, and the autonomous driving control device.

The second distributor may supply the power to an emergency braking control device of the braking device, and the third distributor may supply the power to a parking brake control device of the braking device.

The power control apparatus may include a central control device configured to receive the power from any one of the first distributor and the second battery and communicate with the power converter, the autonomous driving control device, the second distributor, and the third distributor, wherein the third distributor may further monitor the power converter, the second distributor, and the third distributor, determine, based on the monitored information regarding the power converter, the second distributor, and the third distributor, whether at least one of power lines connected between the power converter and the first to third distributors is disconnected, and transmit, in response to at least one of the power lines being disconnected, disconnection information to the autonomous driving control device.

The third distributor may include a switch connected to the second battery, the third distributor may further control turning-off of the switch upon determining that the second battery is in a discharging mode, and determine, based on the monitoring information on the second distributor, whether any one of the power line between the first distributor and the second distributor and the power line between the second distributor and the third distributor is disconnected.

The third distributor may control, in response to a message not being received from the central control device, the second battery to supply the power of the second battery to the central control device, control, in response to a message for power input of the power converter being received from the central control device while the power of the second battery is supplying to the central control device, the second battery to cut off the power supply of the second battery, and control, in response to a message for power non-input of the power converter being received, the second battery to maintain the power supply of the second battery.

The third distributor may monitor a state of charge of the second battery and determine, based on the state of charge of the second battery, whether the power line between the second battery and the third distributor is disconnected.

In accordance with another embodiment of the disclosure, a vehicle includes a braking device, a steering device, one or more sensors, an autonomous driving control device configured to control at least one of the braking device and the steering device based on information detected by the one or more sensors, and a power supply device including a first battery, a second battery outputting a voltage lower than a voltage of the first battery, and a power control device configured to convert and distribute the voltage of the first battery, wherein the power control device is configured to supply the converted and distributed power to the braking device, the steering device, the one or more sensors, and the autonomous driving control device in duplicate.

The power control device may include a power converter configured to convert a voltage supplied from the first battery into a voltage lower than the voltage of the first battery, a power distributor configured to distribute the power supplied from the power converter and supply the distributed power to the braking device, the steering device, the one or more sensors, and the autonomous driving control device in duplicate, a central control device configured to receive power from the power distributor and communicate with the power converter, the autonomous driving control device, and the power distributor, and a battery management device configured to control a charging of the second battery using the power supplied from the power distributor.

The power distributor may include a first distributor connected to the power converter, a second distributor connected to the first distributor and configured to supply the power to the braking device, the steering device, the one or more sensors, and the autonomous driving control device, and a third distributor connected to the second distributor and configured to supply the power to the braking device, the steering device, the sensors, and the autonomous driving control device.

The third distributor may monitor at least one of power, voltage, and current of the power converter, determine, based on the monitored information, whether a power line between the power converter and the first distributor is disconnected, and transmit, in response to the power line between the power converter and the first distributor being disconnected, disconnection information on the power line between the power converter and the first distributor to the autonomous driving control device.

The third distributor may include a switch connected to the second battery, and the third distributor may further control turning-off of the switch upon determining that the second battery is in a discharging mode and determine, based on the monitoring information on the second distributor, whether any one of a power line between the first distributor and the second distributor and a power line between the second distributor and the third distributor is disconnected.

The third distributor may control, in response to a message not being received from the central control device, the second battery to supply the power of the second battery to the central control device, control, in response to a message for power input of the power converter being received from the central control device while the power of the second battery is supplying to the central control device, the second battery to cut off the power supply of the second battery, and control, in response to a message for power non-input of the power converter being received, the second battery to maintain the power supply of the second battery.

The third distributor may transmit, in response to the message for power non-input of the power converter being received, disconnection information on the power line between the first distributor and the central control device to the autonomous driving control device.

The third distributor may monitor a state of charge of the second battery in response to the second battery being in a charging mode and determine, based on the state of charge of the second battery, whether the power line between the second battery and the third distributor is disconnected.

The third distributor may determine the charging mode based on a direction of current of the second battery.

The braking device may include an emergency braking control device configured to receive the power from the second distributor and a parking brake control device configured to receive the power from the third distributor.

BRIEF DESCRIPTION OF THE DRAWINGS

These and/or other embodiments of the disclosure will become apparent and more readily appreciated from the following description of the exemplary embodiments, taken in conjunction with the accompanying drawings, in which.

DETAILED DESCRIPTION OF ILLUSTRATIVE EMBODIMENTS

Figure 1:
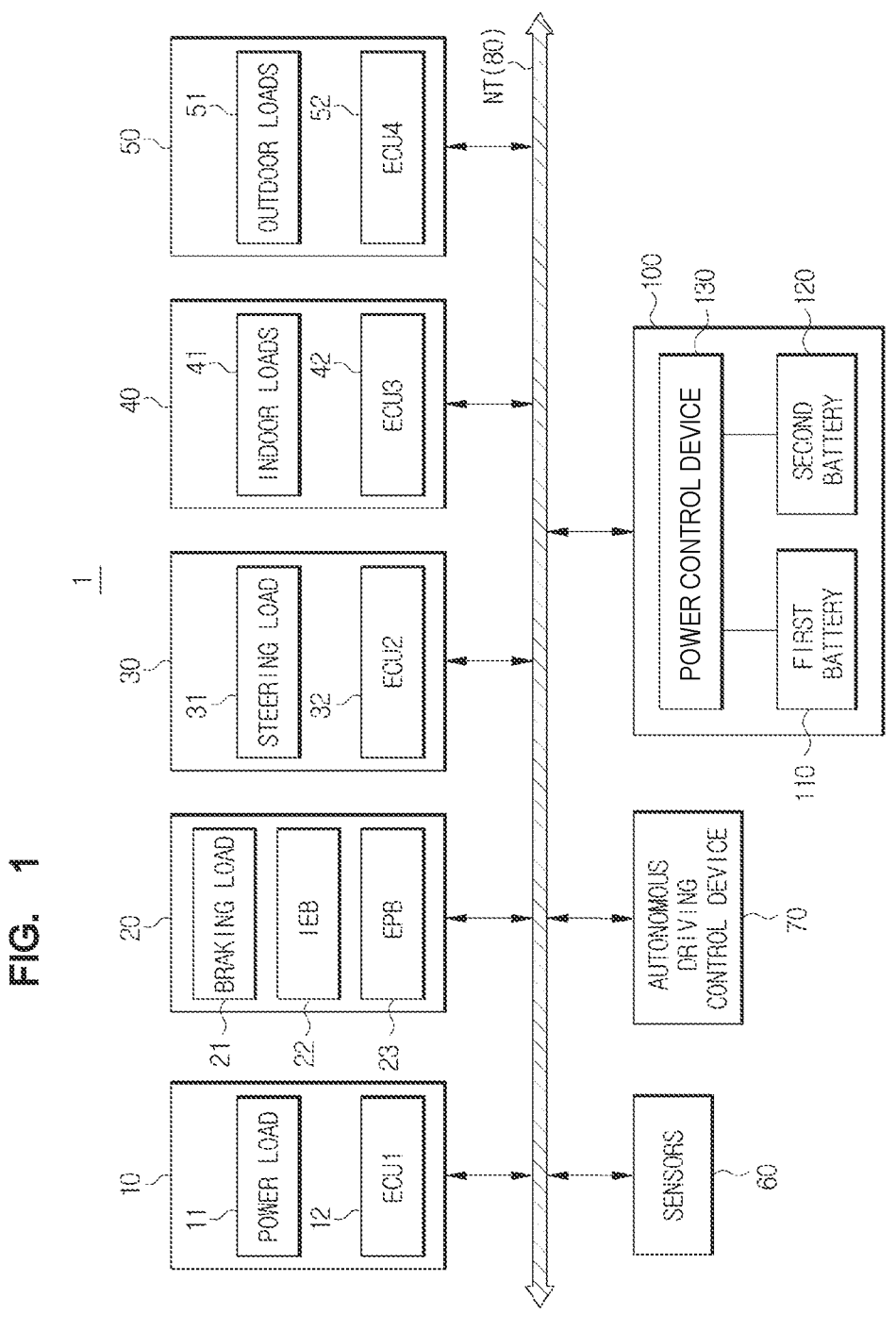
FIG. 1 is a view illustrating a configuration of a vehicle according to an embodiment of the disclosure.

Like reference numerals refer to like elements throughout. The disclosure does not describe all elements of the embodiments such as overlap between the general contents and the embodiments in the technical field to which the disclosure belongs. This specification does not describe all elements of the exemplary embodiments of the disclosure and detailed descriptions on what are well known in the art or redundant descriptions on substantially the same configurations may be omitted. The terms 'part, module, member, block' used in the specification may be implemented in software or hardware, and a plurality of 'parts, modules, members, blocks' may be embodied as one component. It is also possible that one 'part, module, member, block' includes a plurality of components.

Throughout the specification, when an element is referred to as being "connected to" another element, it may be directly or indirectly connected to the other element and "indirectly connected to" includes being connected to the other element via a wireless communication network.

Furthermore, when a part is said to "include" a certain component, this means that it may further include other components, not to exclude other components unless otherwise stated.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, the working principle and embodiments of the disclosure will be described with reference to the accompanying drawings.

FIG. 1 is a view illustrating a configuration of a vehicle according to an embodiment of the disclosure.

A vehicle according to an embodiment may be a vehicle that performs a manual driving mode in which driving is performed in response to a driving intention of a driver and an autonomous driving mode in which autonomous driving to a destination is performed based on current location information and destination information of the vehicle.

A vehicle according to an embodiment may be an internal combustion engine vehicle or an eco-friendly vehicle.

The eco-friendly vehicle may include an electric vehicle (EV) that includes a rechargeable battery and a drive motor and rotates the drive motor with electricity stored in the battery and drives wheels by using the rotation of the drive motor, a hybrid vehicle (HEV) that includes an engine, a battery, and a drive motor and drives by controlling the mechanical power of the engine and the electric power of the drive motor, and a fuel cell electric vehicle (FCEV).

An exemplary embodiment describes an EV as an example.

As shown in FIG. 1, a vehicle 1 may include a power device 10, a braking device 20, a steering device 30, an internal electronic device 40, an external electronic device 5o, a plurality of sensors 60, an autonomous driving control device 70, and a power supply device 100.

The power device 10 may include a power load 11 for applying driving force to rear right, rear left, front right, and front left wheels of the vehicle and a first electronic control unit 12 (ECU1) for controlling an operation of the power load 11.

For example, the power load 11 may include a driving motor (not shown) that generates rotational force using electrical energy of a first battery 110 and transmits the generated rotational force to wheels so that the wheels are driven, an inverter (not shown) that converts the power of the first battery 11o into driving power of the driving motor and transmits the converted driving power to the driving motor, and a reducer (not shown) that transmits the rotational force that reduces a speed of the driving motor and increases a torque of the driving motor to the wheels.

The driving motor may operate as a generator to charge the first battery 11o under energy regeneration conditions, such as braking, deceleration, downhill driving, or low-speed driving of the vehicle.

The braking device 20 may include a braking load 21 that reduces the speed of the vehicle 1 or stops the vehicle 1 by using friction with wheels and a braking control module (or electronic brake control module) that controls operation of the braking load 21.

The braking load 21 may include a hydraulic brake device.

The braking load 21 may include a parking brake device that generates braking force by converting kinetic energy into thermal energy using frictional force generated when brake pads press against opposite sides of a disk rotating together with a wheel.

The braking control module may control the brake load 21 in response to a user's intention to brake through a brake pedal and/or a slippage of wheels. For example, the braking control module may temporarily release braking of the wheels in response to the slippage of the wheels detected during braking of the vehicle 1 (e.g., an anti-lock braking system (ABS)).

The braking control module may selectively release braking of the wheels in response to oversteering and/or understeering detected during steering of the vehicle 1 (e.g., an electronic stability control (ESC)).

The braking control module may temporarily brake the wheels in response to a slippage of the wheels detected while the vehicle 1 is driving (e.g., a traction control system (TCS)).

The braking device 20 may include an emergency braking control device (e.g., an intelligent emergency braking (IEB)) 22 that generates braking force in response to a risk of collision with an obstacle and a parking brake control device (e.g., an electric parking brake (EPB)) 23 that controls operation of a parking brake.

The parking brake control device 23 may control operation of the parking brake device in response to an input of a parking switch (not shown).

The parking brake control device 23 may automatically operate the parking brake when the vehicle is stopped or parked and automatically release the parking brake when an accelerator pedal is pressed after the vehicle starts.

The steering device 30 may include a steering load 31 that changes a driving direction of the vehicle 1 and a second electronic control unit (ECU2) 32 that controls operation of the steering load.

For example, the steering device 30 may be an electronic power steering (EPS) that allows a driver to easily manipulate the steering wheel in response to the driver's intention to steer through the steering wheel.

The EPS may be provided in a hydraulic type configured for generating steering force using hydraulic pressure or an electric type configured for generating steering force using rotational force of a steering motor. Herein, the electric type may be driven by a column driving method generating steering force by driving the steering motor provided in a column and a rack driving method generating steering force by driving the steering motor provided in a rack.

The ECU2 32 may control the EPS to decrease steering force during slow driving or parking and to increase steering force during high speed driving.

The internal electronic device 40 may be one or two or more electronic devices provided on an interior of the vehicle.

The internal electronic device 40 may include indoor loads 41 that provide state information and driving information of the vehicle and provide convenience to a user and/or ensures a safety of the user and a third electronic control unit (ECU3) 42 that controls operations of the indoor loads 41.

For example, the indoor loads 41 may include a first heating wire for supplying heat to a cluster, a terminal for the vehicle, a head unit, and the seat, a second heating wire for supplying heat to the steering wheel, and a ventilation device for circulating air in the seat, and may further include other devices, such as a seat positioning adjustment device, a window glass opening and closing device, a door locking and unlocking device, and a side mirror angle adjusting device.

The external electronic device 50 may be one or two or more electronic devices provided on an exterior of the vehicle.

The external electronic device 50 may include outdoor loads 51 and a fourth electronic control unit (ECU4) 52 that controls operations of the outdoor loads 51.

For example, the outdoor loads 51 may include a side mirror adjustment device for providing a driver with a rearward field of view of the vehicle 1, a lamp that allows the driver to easily view surrounding information while keeping an eye on a frontward field of view and functions as a signal and communication for other vehicles and pedestrians, and wipers.

The internal electronic device 40 and the external electronic device 50 according to the embodiment may be electronic devices unnecessary for controlling autonomous driving. In other words, the internal electronic device 40 and the external electronic device 50 may be any electronic devices except electronic devices required for controlling autonomous driving.

The ECU3 42 of the internal electronic device 40 and the ECU4 52 of the external electronic device 50 may be provided for each load or may be provided as one to control the indoor loads and the outdoor loads integrally.

The plurality of sensors 60 may detect a road environment, a driving state of the vehicle, and surrounding environments of the vehicle.

The plurality of sensors 60 may detect information required for controlling autonomous driving.

For example, the plurality of sensors 60 may include at least one of a wheel speed sensor and an acceleration sensor for detecting a driving speed of the vehicle and may further include a plurality of distance sensors for detecting distances to other nearby vehicles and obstacles, an angular velocity sensor for detecting an angular velocity of the steering wheel for detecting a steering angle of the vehicle, a yaw rate sensor for detecting a yaw moment of the vehicle, an illuminance sensor for detecting outdoor illuminance, and a door opening/closing sensor.

The plurality of sensors 60 may include one or more image sensors for acquiring images of the road environments and the surrounding environments.

The distance sensors may include at least one of a radar sensor, a light detection and ranging (LiDAR) sensor, and an ultrasonic sensor.

Upon receipt of an autonomous driving mode through an input device (not shown), the autonomous driving control device 70 may search for a route from a current location to the destination based on current location information received through a location receiver and destination information received through the input device and control the autonomous driving from the current location to the destination based on the searched route and map information.

The autonomous driving control device 70 may recognize road environments, a driving state of the vehicle, and obstacles based on various information detected by a plurality of sensors during autonomous driving control and may autonomously control driving along the searched route while avoiding obstacles based on the recognized road environments, obstacle information, and vehicle's driving state.

The autonomous driving control device 70 may recognize other vehicles, pedestrians, cyclists, lanes, road signs, etc. based on image information acquired by one or more image sensors.

The autonomous driving control device 70 may obtain a relative position and relative speed of surrounding obstacles (e.g., other vehicles, pedestrians, cyclists, etc.) based on distance information detected by the plurality of distance sensors.

Upon receipt of the image information of the road during autonomous driving control, the autonomous driving control device 70 may recognize lanes on a road through image processing, recognize a host lane through which a host vehicle travels and surrounding lanes based on positional information of the recognized lanes, create a following lane based on lane information and route information of the recognized host lane, and control autonomous driving based on location information of the generated following lane and obstacle information.

The autonomous driving control device 70 may control the speed of the vehicle so that an actual driving speed of the vehicle matches a target driving speed of the vehicle based on driving speed information and the target driving speed information detected by the speed sensors during autonomous driving control. Herein, the target driving speed information may be preset driving speed information or may be target driving speed information input by a user.

The autonomous driving control device 70 may control the display device (not shown) to display navigation information in which map information, departure information, destination information, route information, and road guidance information are matched as an image during autonomous driving control.

The autonomous driving control device 70 may periodically confirm current location information of the vehicle during autonomous driving control and control the display device to display navigation information matched with the confirmed current location information of the vehicle as an image.

The autonomous driving control device 70 may also control a speaker (not shown) to output navigation information as sound during autonomous driving control.

Upon determining that at least one power line among a plurality of power lines provided in the power supply device 100 is disconnected, the autonomous driving control device 70 may take over the control right of the vehicle to a user. When taking over the control right, the autonomous driving control device 70 may control the display device to output guide information for guiding driving in the manual driving mode.

Upon determining that at least one power line among a plurality of power lines provided in the power supply device 100 is disconnected, the autonomous driving control device 70 may control the display device to display disconnection information on the disconnection of the at least one power line.

The power supply device 100 may supply power to the power device 10, the braking device 20, the steering device 30, the internal electronic device 40, the external electronic device 50, the plurality of sensors 60, and the autonomous driving control device 70.

Figure 2:
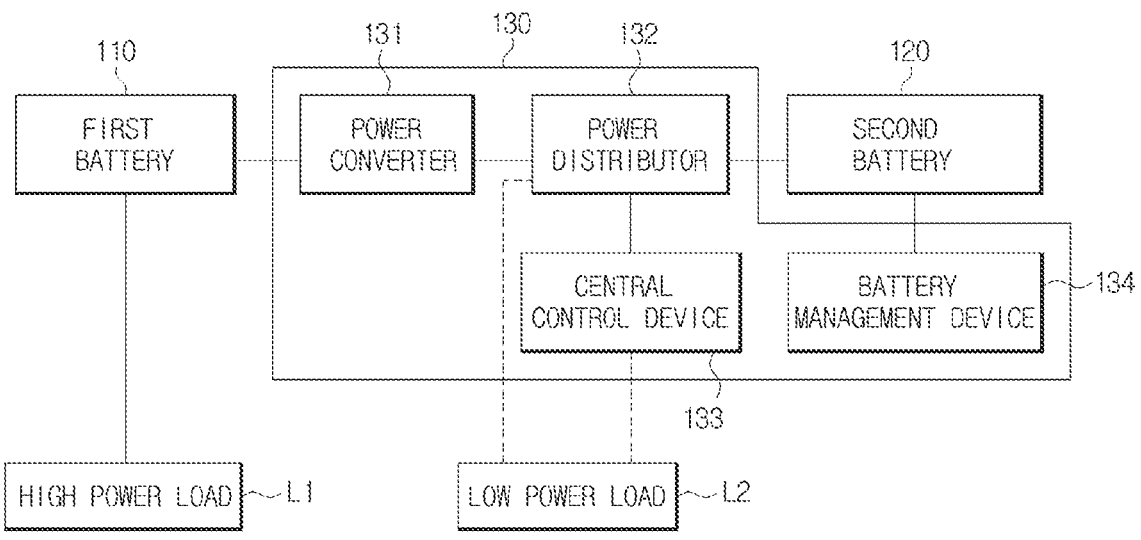
FIG. 2 is a view illustrating a configuration of a power supply device provided in a vehicle according to an embodiment of the disclosure.

As illustrated in FIG. 2, the power supply device 100 may include a first battery 11o, a second battery 120, and a power control device 130 for controlling power supplied through the first battery no and the second battery 120.

The first battery 110 may be charged and discharged.

The first battery 110 may be charged by receiving external power and may be charged by using power generated during regenerative braking.

The first battery 110 may be a main power source of a high power load L1 provided in the vehicle.

The first battery no may supply power to a powertrain including a driving motor of the power device 10 and the high power load L1 consuming high voltage power.

The high power load L1 may include a compressor of an air conditioner or a heater for air conditioning.

The high power load L1 may be a load to which a voltage greater than or equal to a preset voltage is applied.

The first battery 110 may also supply power to the second battery 120.

The second battery 120 may be charged and discharged.

The second battery 120 may be charged by using the power charged in the first battery 110.

The second battery 120 may supply power to a low power load L2 when the vehicle is in a stopped state. In other words, the second battery 120 may be an auxiliary power source for the low power load L2 provided in the vehicle.

The second battery 120 may supply power to a central control device 133 when a disconnection (i.e., open) occurs in the central control device 133 of the power supply device 100.

The low power load L2 may be a load to which a voltage less than the preset voltage is applied.

The low power load L2 may be a load that consumes operations by receiving a lower voltage than the voltage consumed by the high power load L1.

For example, the low power load L2 may include the braking device 20, the steering device 30, the internal electronic device 40, the external electronic device 50, the plurality of sensors 60, and the autonomous driving control device 70, and the like.

The power control device 130 may be a device that manages low-voltage power.

The power control device 130 may also manage high-voltage power.

The power control device 130 may monitor the entire power state of the vehicle, recognize a disconnection of the power lines in the vehicle, and transmit disconnection information of the recognized power line to the autonomous driving control device 70. A specific configuration of the power control device 130 will be described later.

The above described devices of the vehicle may communicate with each other through a communication network for a vehicle (NT) 80. For example, electronic components of the vehicle may exchange data through Ethernet, Media Oriented Systems Transport (MOST), Flexray, Controller Area Network (CAN), Local Interconnect Network (LIN), and the like.

More specifically, the communication network performs communication between various electronic devices inside the vehicle.

The NT 80 may include one or more components that enable communication with internal devices and external devices of the vehicle, for example, at least one of a short-range communication module, a wired communication module, and a wireless communication module.

The short-range communication module may include various short-distance communication modules for transmitting and receiving signals using a wireless communication network in a short distance such as a Bluetooth module, an infrared communication module, a Radio Frequency Identification (RFID) communication module, a Wireless Local Access Network (WLAN) communication module, a Near Field Communication (NFC) module, a Zigbee communication module, and the like.

The wired communication module may include a variety of wired communication modules such as a Controller Area Network (CAN) communication module, a Local Area Network (LAN) module, a Wide Area Network (WAN) module, a Value Added Network (VAN) module, and the like, and various cable communications such as Universal Serial Bus (USB), High Definition Multimedia Interface (HDMI), Digital Visual Interface (DVI), Recommended Standard 232 (RS-232), power line communication, Plain Old Telephone Service (POTS), and the like.

The wireless communication module may include a wireless communication module supporting various wireless communication methods such as a Wireless Fidelity (WiFi) module, a Wireless Broadband (WiBro) module, Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), Ultra Wide Band (UWB), and the like.

The vehicle may further include a location receiver for acquiring current location information of the vehicle.

The location receiver may include a Global Positioning System (GPS) receiver. Herein, the GPS receiver includes an antenna module and a signal processor for receiving signals from a plurality of GPS satellites. The signal processor may include software for obtaining a current location using distance and time information corresponding to location signals of the plurality of GPS satellites and a transmitter for transmitting the obtained vehicle location information.

FIG. 2 is a configuration view illustrating a power supply device provided in a vehicle according to an embodiment of the disclosure.

The power control device may include a power converter 131 that converts high-voltage direct current (DC) power of the first battery 110 into low-voltage DC power, a power distributor 132 that distributes the low-voltage power converted by the power converter 131 and supplies the distributed power to the low-power load L2, the central control device 133 that controls communication between components inside the power control device 130, and a battery management device 134 that manages charging and discharging of the second battery 120.

The first battery 110, the power converter 131, the power distributor 132, the central control device 133, the battery management device 134, and the second battery 120 are connected to each other through power lines.

The power converter 131 may be a lower dc-dc converter (LDC) that converts high-voltage DC power into low-voltage DC power.

The power converter 131 may include at least one switch element and an inductor.

The power converter 131 may supply the converted low-voltage power to the power distributor 132. Accordingly, the low-voltage power converted by the power converter 131 may be supplied to the low power load L2.

The low-voltage power supplied through the power converter 131 may be used as a main power source for the low power load L2 when the vehicle is in a driving state.

The power converter 131 may convert the DC power of the first battery 110 into DC power required for charging the second battery 120 and supply the converted DC power to the second battery 120 to charge the second battery 120.

The power converter 131 may supply power to the second battery 120 when the vehicle is in the driving state.

The power converter 131 may include a first monitoring module that monitors at least one of voltage, current, and power output from the power converter 131 to transmit monitoring information of the power converter 131 to the power distributor 132.

The power converter 131 may transmit the monitoring information of the first monitoring module to the power distributor 132.

The power converter 131 may determine whether an operating state of the power converter 131 is a normal state based on voltage information of the power converter 131 and detect a power value consumed by the power upon determining that the operating state is not the normal state. Next, the power converter 131 may determine that a first power line P1 is in the normal state if the detected power value is greater than or equal to a reference power value, determine that the first power line P1 has been disconnected if the detected power value is less than the reference power value, and directly transmit disconnection information of the first power line P1 to the power distributor 132.

The first power line P1 may be a power line connected between the power converter 131 and the power distributor 132.

The power distributor 132 may be connected to the power converter 131 and distribute the low-voltage power supplied from the power converter 131 to supply the distributed power to the low power load L2.

The power distributor 132 may be a junction block.

The power distributor 132 may supply low-voltage power to the low power load L2 excluding the internal electronic devices 40. For example, the power distributor 132 may supply low-voltage power to the external electronic devices 50, the braking device 20, the steering device 30, the sensors 60, and the autonomous driving control device 70.

The power distributor 132 may supply low-voltage power to the braking device 20, the steering device 30, the sensors 60, and the autonomous driving control device 70 in duplicate.

The power distributor 132 may monitor at least one of voltage, current, and power input to the power distributor 132.

The power distributor 132 may communicate with the power converter 131, the central control device 133, and the battery management device 134, determine whether the plurality of power lines are disconnected based on a message received through communication, and transmit disconnection information of the determined plurality of power lines to the autonomous driving control device 70.

The power distributor 132 may determine whether a disconnection has occurred in the central control device 133 based on whether a message is received during communication with the central control device 133 and, upon determining that the disconnection has occurred in the central control device 133, control the power of the second battery 120 to be transmitted to the central control device 133.

Upon determining that there is no disconnection in the central control device 133 while supplying power from the second battery 120 to the central control device 133, the power distributor 132 may cut off the power of the second battery 120.

If a message for main power input is not received from the central control device 133 after supplying power from the second battery 120 to the central control device 133, the power distributor 132 may determine that disconnection has occurred and maintain power supply of the second battery 120.

Upon receipt of information regarding disconnection with the main power source from the central control device 133, the power distributor 132 may transmit the disconnection information with the main power source to the autonomous driving control device 70.

The power distributor 132 may determine whether the power converter 131 is disconnected based on the monitoring information of the power converter 131 and, upon determining that the disconnection has occurred in the power converter 131, transmit the disconnection information with the power converter 131 to the autonomous driving control device 70.

The power distributor 132 may determine whether the second battery 120 is disconnected based on a state of charge (SoC) of the second battery 120 and, upon determining that the second battery 120 has been disconnected, transmit the disconnection information with the second battery 120 to the autonomous driving control device 70.

A configuration of the power distributor 132 will be described later.

The central control device (e.g., Integrated Central Control Unit (ICU)) 133 may be connected to the power distributor 132, receive the low voltage power from the power distributor 132, and distribute the low voltage power supplied from the power distributor 132 to the internal electronic device 40 among the low power loads.

The central control device 133 may receive the low voltage power converted from the power converter 131 through the power distributor 132. In this case, the low voltage power converted by the power converter 131 may be the main power source for the low power loads.

If the input voltage is less than or equal to the preset voltage, an operation of the central control device 133 is stopped. In this case, the central control device 133 may receive the power from the second battery 120 in response to a control of the power distributor 132.

The central control device 133 may receive the power from the second battery 120 through the power distributor 132. In this case, the power supplied from the second battery 120 may be the auxiliary power source for the low power loads.

The central control device 133 may communicate with the power converter 131, the power distributor 132, and the battery management device 134 and enable communication between components inside the power control device 130 and communication between components within the vehicle by performing communication with the braking device 20, the steering device 30, the external electronic device 50, the sensors 60, and the autonomous driving control device 70.

The central control device 133 may include a second monitoring module that monitors at least one of voltage, current, and power input to the central control device 133 and transmits monitoring information of the central control device 133 to the power distributor 132.

The battery management device 134 may monitor the charge state and discharge state of the second battery 120 and transmit information of the monitored second battery to the power distributor 132. In other words, the battery management device 134 may monitor input/output power of the second battery 120.

The battery management device 134 may include a plurality of sensors (not shown) that collects information on a state of the second battery 120, such as an output voltage of the second battery 120, an input/output current of the second battery 120, and a temperature of the second battery 120.

The plurality of sensors provided in the battery management device 134 may include a current sensor for detecting the current of the second battery 120, a voltage sensor for detecting the voltage of an output terminal of the second battery 120, and a temperature sensor for detecting the temperature of the second battery 120.

The battery management device 134 may obtain the SoC of the second battery 120 corresponding to the current, voltage, and temperature of the second battery from a pre-stored table. A charge amount of the second battery 120 corresponding to a correlation between current, voltage, and temperature of the second battery 120 respectively may be matched to the pre-stored table.

The battery management device 134 may calculate and manage the SoC of the second battery 120 and the state of health (SoH) of the second battery 120 based on information on the state of the second battery 120.

The battery management device 134 may include an intelligent battery switch (not shown) for controlling charging and discharging of the second battery 120.

The battery management device 134 may control turning-on/off of the switch based on the SoC of the second battery 120.

The battery management device 134 may control the turning-on of the switch to charge the second battery 120 such that the second battery 120 is charged using the power of the first battery no, identify the SoC of the second battery 120 during charging, and if the charge amount corresponding to the identified SoC is a predetermined allowable charge amount, control turning-off of the switch so that charging is stopped.

The battery management device 134 may be implemented as a memory (not shown) that stores data for algorithms for controlling charging and discharging of the second battery 120 or for a program that reproduces the algorithms and a processor (not shown) that performs the above-described operation using the data stored in the memory. In this case, the memory and the processor may be implemented as separate chips. Alternatively, the memory and the processor may be implemented as a single chip.

Figure 3:
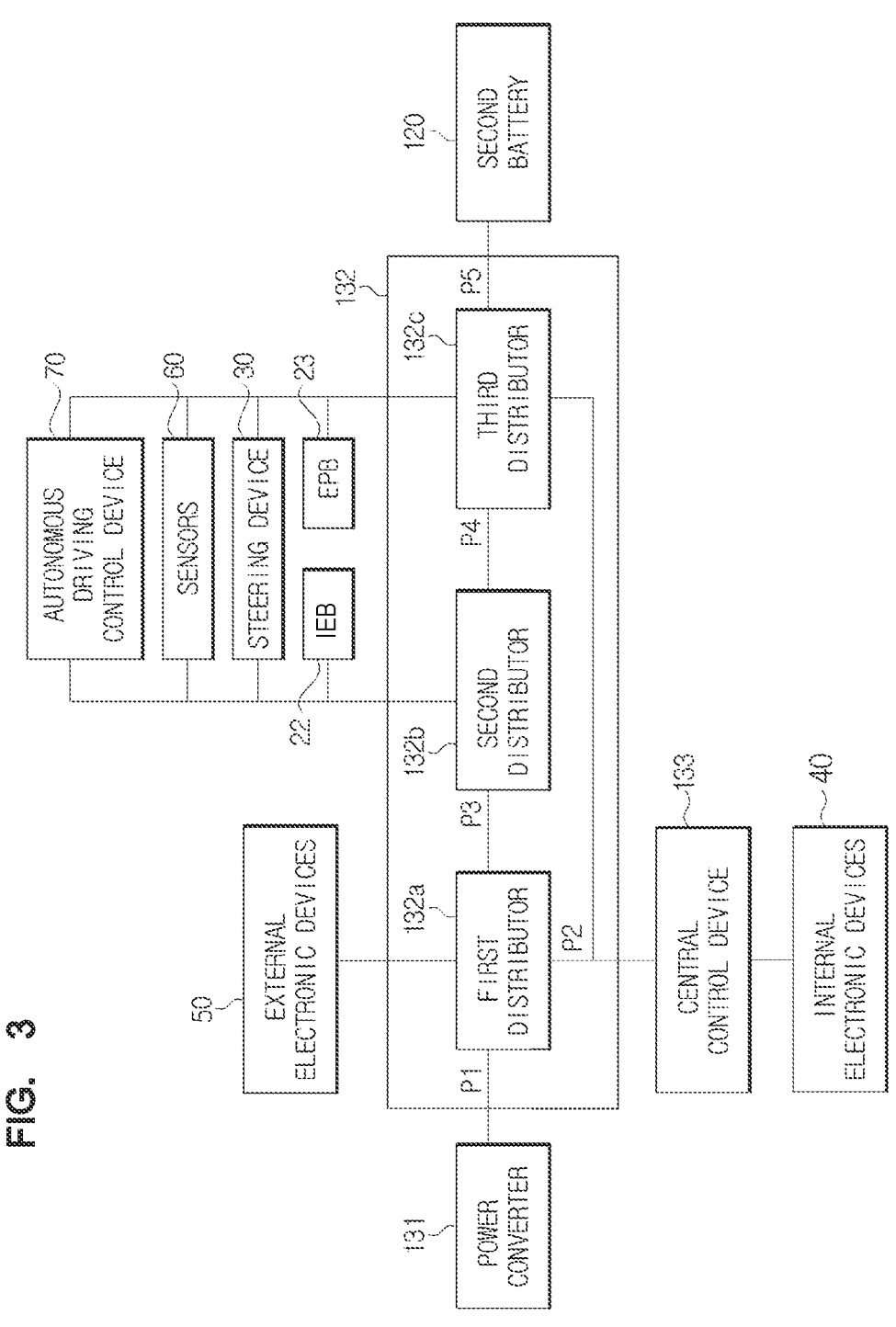
FIG. 3 is view illustrating a detailed configuration of a power control device of the power supply device shown in FIG. 2.

FIG. 3 is a detailed configuration view illustrating a power control device of the power supply device shown in FIG. 2 and will be described with reference to FIG. 4.

Figure 4:
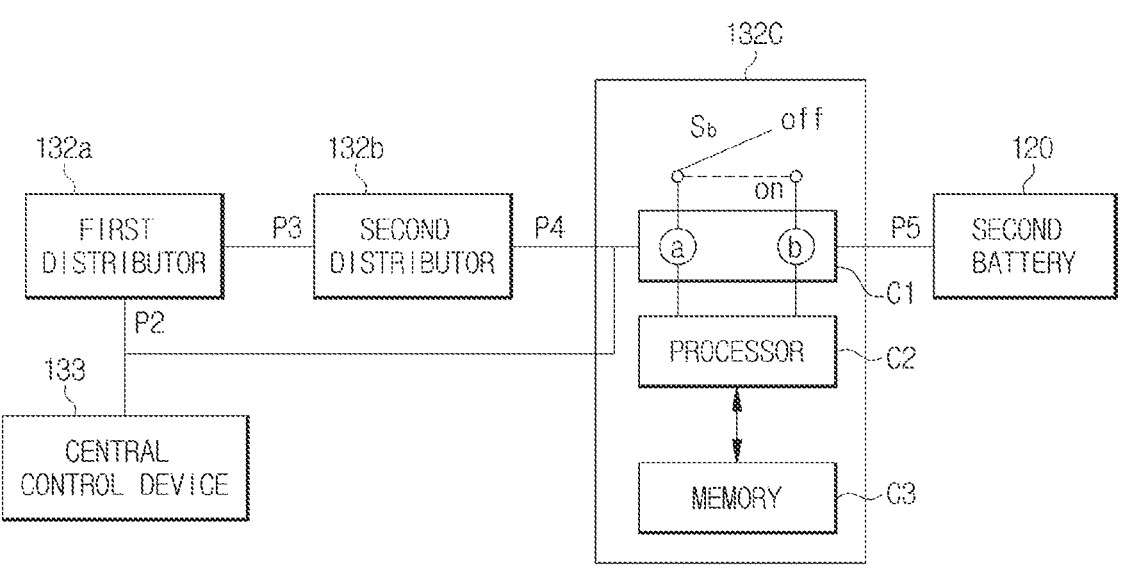
FIG. 4 is view illustrating a detailed configuration of a third distributor of the power control device shown in FIG. 3.

FIG. 4 is a detailed configuration view illustrating a third distributor of the power control device shown in FIG. 3.

The power distributor 132 provided in the power control device 130 may include a first distributor 132a, a second distributor 132b, and a third distributor 132c.

The power converter 131 may convert, when the vehicle is in the driving state, the power supplied from the first battery 110 into low-voltage DC power and supply the converted low-voltage DC power to the first distributor 132a.

The power converter 131 may monitor at least one of voltage, current, and power output from the power converter 131 and transmit at least one piece of monitoring information to the third distributor 132c.

The power converter 131 may determine whether the power converter 131 is disconnected based on the at least one piece of monitoring information and, upon determining that the power converter 131 is disconnected, also transmit the disconnection information of the power converter 131 to the third distributor 132c.

The first distributor 132a may be connected to the power converter 131 and may be connected to the central control device 133 and the external electronic devices 50.

The first distributor 132a may be connected to the second distributor 132b.

The first distributor 132a may supply the low-voltage power supplied from the power converter 131 to the central control device 133 and the external electronic devices 50 and also may supply it to the second distributor 132b.

The first distributor 132a may be a junction block for power distribution that distributes the low-voltage power supplied from the power converter 131 and supplies the distributed power to other devices.

The central control device 133 may be connected to the first distributor 132a and the internal electronic devices 40 and may supply the low-voltage power supplied from the first distributor 132a to the internal electronic devices 40.

The central control device 133 may monitor at least one of voltage, current, and power input to the central control device 133 and transmit the monitoring information of the central control device 133 to the third distributor 132c.

The central control device 133 may receive the low-voltage power converted from the power converter 131 through the first distributor 132a. In this case, the low-voltage power converted by the power converter 131 may be the main power source for the low power loads.

If the input voltage is less than or equal to the preset voltage, the operation of the central control device 133 is stopped. In this case, the central control device 133 may receive the power from the second battery 120 in response to the control of the third distributor 132c.

The central control device 133 may be connected to the third distributor 132c and receive the power from the second battery 120 through the third distributor 132c. In this case, the power supplied from the second battery 120 may be the auxiliary power source for the low power loads.

When power is supplied from the second battery 120, the central control device 133 may determine whether the main power is input through the power converter 131, transmit a message on main power input to the third distributor 132C upon determining that the main power is input, and transmit a message for main power non-input to the third distributor 132C upon determining that the main power does not input.

The central control device 133 may enable communication between components inside the power supply device 100 using the power supplied from the second battery 120 when power is not input from the main power source and also enable communication with electronic devices within the vehicle. Herein, the main power may be the power of the power converter 131 supplied through the first distributor 132a.

The central control device 133 may supply power to the internal electronic devices 40 using the power supplied from the second battery 120.

The second distributor 132b may be connected to the first distributor 132a to receive the low-voltage power from the first distributor 132a.

The second distributor 132b may be connected to the autonomous driving control device 70, the sensors 60, the braking device 20, and the steering device 30 and supply power to the autonomous driving control device 70, the sensors 60, the braking device 20, and the steering device 30.

The second distributor 132b may supply power to the emergency braking control device 22 of the braking device 20.

The second distributor 132b may include a third monitoring module that monitors at least one of voltage, current, and power input from the first distributor 132a.

The second distributor 132b may transmit monitoring information monitored by the third monitoring module to the third distributor 132c.

The third distributor 132c may be connected to the second distributor 132b to receive power from the second distributor 132b.

The third distributor 132c may be connected to the autonomous driving control device 70, the sensors 60, the braking device 20, and the steering device 30 and supply power to the autonomous driving control device 70, the sensors 60, the braking device 20, and the steering device 30.

The third distributor 132c may supply power to the parking brake control device 23 of the braking device 20.

The third distributor 132c may include a fourth monitoring module C1 (see FIG. 4) that monitors at least one of voltage, current, and power input from the second distributor 132b.

The voltage, current, and power input from the second distributor 132b may be the voltage, current, and power of the second distributor 132b.

The fourth monitoring module C1 (see FIG. 4) of the third distributor 132c may monitor at least one of voltage, current, and power input from the second battery 120 and also monitor at least one of voltage, current, and power output from the second battery 120.

The third distributor 132c may be connected to the second battery 120 and supply the low-voltage power converted by the power converter 131 to the second battery 120, thereby charging the second battery 120.

The third distributor 132c may supply power from the second battery 120 to the central control device 133.

The third distributor 132c may supply power from the second battery 120 to the first distributor 132a, the internal electronic devices 40, the second distributor 132b, and the external electronic devices 50. In addition, the third distributor 132c may also supply power from the second battery 120 to the autonomous driving control device 70, the sensors 60, the steering device 30, and the braking device 20.

The second distributor 132b and the third distributor 132c may be junction blocks that distribute the low-voltage power to be supplied to a load for autonomous driving.

The second distributor 132b and the third distributor 132c simultaneously supply power to the autonomous driving control device 70, the sensors 60, and the steering device 30.

Accordingly, even if a disconnection occurs in at least one power line among the first power line P1, a third power line P3, and a fourth power line P4, power of the second battery 120 may be supplied to the autonomous driving control device 70, the sensors 60, and the steering device 30 through the third distributor 132c. In this case, the parking brake control device 23 of the braking device may receive power from the second battery 120 through the third distributor 132c.

Furthermore, if a disconnection occurs in the fourth power line P4 or a fifth power line P5, power of the second battery 120 may be supplied to the autonomous driving control device 70, the sensors 60, and the steering device 30 through the second distributor 132b. In this case, the emergency braking control device 22 of the braking device 20 may receive power from the power converter 131 through the second distributor 132b.

As shown in FIG. 4, the third distributor 132c may include a switch Sb and a processor C2.

The switch Sb may be turned on when the second battery 120 is charged or discharged.

The switch Sb may be turned off when determining whether the third power line P3 and the fourth power line P4 are disconnected.

The switch Sb may supply power from the second battery 120 to the central control device 133 when determining whether the second power line P2 is disconnected.

The processor C2 of the third distributor 132c may control the turning-off of the switch Sb when determining whether the third power line P3 and the fourth power line P4 are disconnected.

When determining whether the second power line P2 is disconnected, the processor C2 of the third distributor 132c may control the turning-on of the switch Sb.

When the central control device 133 is in the normal state, the processor C2 of the third distributor 132c may control the turning-off of the switch Sb so that the power of the second battery 120 supplied to the central control device 133 is cut off.

Upon determining that a disconnection occurs in the central control device 133, the processor C2 of the third distributor 132*c* may control the turning-on of the switch Sb to supply power from the second battery 120 to the central control device 133.

The switch that is turned off when determining whether the third power line P3 and the fourth power line P4 are disconnected and the switch for supplying power from the second battery 120 to the central control device 133 may be different switches. In other words, the third distributor 132*c* may further include a switch for supplying power from the second battery 120 to the central control device 133.

The processor C2 of the third distributor 132*c* may communicate with the power converter 131, the central control device 133, the second distributor 132*b*, and the battery management device 134. In addition, the processor C2 of the third distributor 132*c* may receive monitoring information from the power converter 131, the central control device 133, the second distributor 132*b*, and the battery management device 134, respectively, determine whether the power line is disconnected based on the received monitoring information of the power converter 131, the received monitoring information of the central control device 133, the received monitoring information of the second distributor 132*b*, and the received monitoring information of the battery management device 134, and transmit determination information to the autonomous driving control device 70.

The processor C2 of the third distributor 132*c* may determine whether the first power line P1 between the power converter 131 and the first distributor 132*a*, the second power line P2 between the first distributor 132*a* and the central control device 133, the third power line P3 between the first distributor 132*a* and the second distributor 132*b*, the fourth power line P4 between the second distributor 132*b* and the third distributor 132*c*, and the fifth power line P5 between the third distributor 132*c* and the second battery 120 are disconnected.

The above described configurations will be explained in more detail.

The processor C2 of the third distributor 132*c* may monitor the power converter 131.

The processor C2 may monitor at least one of voltage, current, and power of the power converter 131.

The processor C2 may determine whether the first power line P1 is disconnected based on the monitoring information of the power converter 131.

The processor C2 may determine whether the operating state of the power converter 131 is in the normal state based on the monitoring information of the power converter 131, determine whether there is power consumption in the power converter 131 upon determining that the operating state is not in the normal state, and determine that the first power line P1 is disconnected upon determining that there is no power consumption.

Upon determining that the operating state of the power converter 131 is in the normal state, the processor C2 may determine the first power line P1 is in the normal state.

Determining whether the operating state thereof is in the normal state may include determining whether the voltage value of the power converter 131 falls within a first reference voltage range, determining whether the current value of the power converter 131 falls within a reference current range, and determining whether a magnitude of noise of the power converter 131 falls within a reference range.

Upon determining that there is power consumption in the power converter 131, the processor C2 may determine that the first power line P1 is in the normal state.

In other words, the processor C2 detects the power value consumed by the power converter 131 and determines that there is power consumption if the detected power value is greater than or equal to a reference power value, thereby determining that the first power line P1 is in the normal state.

Upon determining that the first power line P1 is disconnected, the processor C2 may transmit the disconnection information of the first power line P1 to the autonomous driving control device 70.

The processor C2 may directly receive the disconnection information of the first power line P1 from the power converter 131.

The processor C2 may communicate with the central control device 133, determine whether a message is received from the central control device 133, and upon determining that the message is not received, turn on the switch Sb so that the power of the second battery 120 is supplied to the central control device 133.

The processor C2, during powering of the second battery 120 to the central control device 133, may turn off the switch Sb so that the power supply of the second battery 120 is cut off when a message regarding main power input is received. In addition, the processor C2 may determine that the disconnection has occurred in the second power line P2 when a message regarding main power non-input is received and transmit the disconnection information of the second power line P2 to the autonomous driving control device 70.

The message for main power input is a message for normal voltage of main power, and the message for main power non-input is a message for abnormal voltage of main power.

Upon determining that the disconnection occurs in the central control device 133, the processor C2 may maintain and control the turning-on of the switch Sb to maintain power supply of the second battery 120 to the central control device 133.

The processor C2 may identify a direction of current when the vehicle is on (e.g., EV Ready) and is ready to drive and, upon determining that the direction of current is a first direction, determine an operating mode of the second battery 120 as a charging mode.

Herein, the first direction is a forward direction, which is a direction in which current flows from the second distributor 132*b* to the second battery 120.

In response to the direction of current being determined to be a second direction, the processor C2 may determine whether a monitoring mode for the second battery 120 is in an off state and, upon determining that the monitoring mode for the second battery 120 is in the off state, switch the monitoring mode for the second battery 120 to an on state.

The processor C2 may receive the monitoring information from the battery management device 134, identify the charge amount of the second battery 120 based on the received monitoring information of the second battery 120, and store first charge amount information about the charge amount of the second battery 120.

Upon determining that the charge amount of the second battery exceeds a reference charge amount based on the first charge amount information, the processor C2 may determine that the fifth power line P5 is in the normal state.

Upon determining that the charge amount of the second battery is less than or equal to the reference charge amount based on the first charge amount information, the processor C2 may switch the monitoring mode for the second battery 120 to on state.

The processor C2 may count a monitoring time in response to the on state of the monitoring mode, identify the charge amount of the second battery 120 upon determining that the counted monitoring time has passed a first reference time, and compare second charge amount information with the first charge amount information for the identified charge amount of the second battery.

The processor C2 may obtain an increase in the charge amount based on the second charge amount information and the first charge amount information, determine that the fifth power line P5 is in the normal state upon determining that the obtained increase exceeds a reference increase, store the second charge amount information, determine that the fifth power line P5 is disconnected upon determining that the obtained increase is less than or equal to the reference increase, and transmit the disconnection information of the fifth power line P5 to the autonomous driving control device 70.

Upon determining that the obtained increase exceeds the reference increase, the processor C2 may switch the monitoring mode of the second battery 120 to the off state.

Upon determining that the charge amount of the second battery exceeds the reference charge amount based on the first charge amount information, the processor C2 may turn off the monitoring mode of the second battery.

The processor C2 may determine whether a direction of current is the first direction when the vehicle is on (e.g., EV Ready) and is ready to drive.

In response to the direction of current not being the first direction, the processor C2 first identifies the charge amount of the second battery.

The processor C2 may determine the direction of current when the switch Sb is turned on and, upon determining that the direction of current is the second direction, determine the operating mode of the second battery as a discharging mode. Herein, the second direction is a reverse direction in which current flows from the second battery 120 to the second distributor 132b. Additionally, the direction of current may further include a neutral state in which current does not flow.

The processor C2 may determine whether the monitoring mode for the second battery is in the off mode and, upon determining that the monitoring mode is not in the off mode, identify a time for which the direction of current has been maintained in the second direction.

In other words, when it is determined that the monitoring mode is in the on state, the processor X2 may identify the time the direction of current has been maintained in the second direction. The processor C2 may also monitor the direction of current when the monitoring mode is on.

The processor C2 may count a time the direction of current has been maintained in the second direction, determine whether the counted time is greater than or equal to a second reference time, and upon determining that the counted time is greater than or equal to the second reference time, secondarily identify the charge amount of the second battery.

The processor C2 identifies a decrease in the charge amount of the second battery by identifying a difference between the charge amount of the second battery, which is firstly confirmed, and the charge amount of the second battery, which is secondarily confirmed, and then determines whether the identified decrease exceeds a reference decrease.

Upon determining that the decrease in the charge amount of the second battery is less than or equal to the reference decrease, the processor C2 may determine that the third and fourth power lines are in the normal states.

Upon determining that the decrease in the charge amount of the second battery exceeds the reference decrease, the processor C2 may control the turning-off of the switch Sb and monitor the voltage input to the third distributor 132c.

Upon determining that the voltage input to the third distributor 132c falls within a second reference voltage range, the processor C2 may determine that the third power line P3 is disconnected and, upon determining that the voltage input to the third distributor 132c is out of the second reference voltage range, the processor C2 may determine that the fourth power line P4 is disconnected.

The voltage input to the third distributor 132c may be the voltage output from the second distributor 132b.

The processor C2 may identify the current flowing in the second distributor 132b, determine that the fourth power line P4 is disconnected in response to the identified current exceeding a reference current, and determine that the third power line P3 is disconnected in response to the identified current being less than or equal to the reference current.

The processor C2 may determine whether the third and fourth power lines are disconnected based on at least one of current, voltage, and power of the second distributor 132b.

The processor C2 may determine whether the direction of current is in the neutral state in response to the voltage input to the third distributor 132c falling within a reference voltage range, determine that the third power line is disconnected in response to the direction of current being in the neutral state, and also determine that the third power line is in the normal state in response to the direction of current not being in the neutral state.

The processor C2 may determine whether the direction of current is in the second direction in response to the voltage input to the third distributor 132c being out of the reference voltage range, determine that the fourth power line P4 is disconnected in response to the direction of current being in the second direction, and also determine that the fourth power line P4 is in the normal state in response to the direction of current not being in the second direction.

Upon determining that the third power line P3 or the fourth power line P4 is disconnected, the processor C2 may control the turning-on of the switch Sb and then transmit the disconnection information of the third power line P3 or the disconnection information of the fourth power line P4 to the autonomous driving control device 70.

The processor C2 may switch the monitoring mode to the off state when the time for which the direction of current has been maintained in the second direction is less than the second reference time.

The processor C222 may initialize all variables when determining whether the plurality of power lines are disconnected.

The third distributor may further include a memory C3.

The memory C3 may store information about the first and second reference times, the first and second reference voltage ranges, the reference current, the reference power value, the reference charge amount, the reference increase in the charge amount, and the reference decrease in the charge amount, and may further store information about the reference current range and the reference power range.

The memory C3 may be implemented as at least one of a nonvolatile memory device such as cache, read only memory (ROM), programmable ROM (PROM), erasable programmable ROM (EPROM), electrically erasable programmable ROM (EEPROM), and flash memory, or a volatile memory device such as random access memory (RAM), or a storage medium such as hard disk drive (HDD) and CD-ROM, but is not limited thereto.

The memory C3 may be implemented as a separate chip from the processor C2 described above in relation to the processor C2 or may be implemented as a single chip with the processor C2.

At least one component may be added or deleted according to the performance of the components of the vehicle and power supply device shown in FIGS. 1 to 4. In addition, it will be readily understood by those skilled in the art that the mutual positions of the components may be changed corresponding to the performance or structure of the vehicle.

Meanwhile, each component shown in FIGS. 1 to 4 refers to software and/or hardware components, such as a Field Programmable Gate Array (FPGA) and an Application Specific Integrated Circuit (ASIC).

FIG. 5, FIG. 6, FIG. 7, FIG. 8A, and FIG. 8B are control flowcharts illustrating a power control device for a vehicle according to embodiments of the disclosure.

Figure 5:
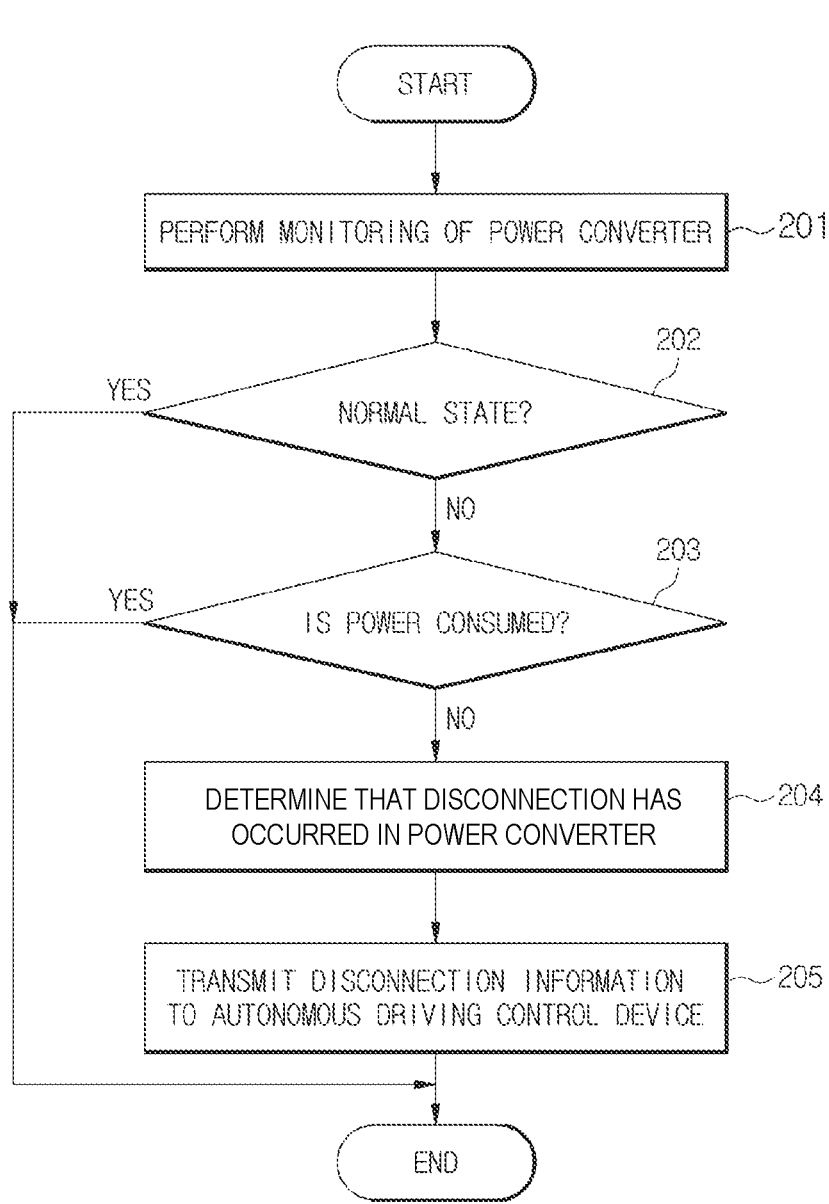
FIG. 5 is a control flowchart illustrating a power control device for determining disconnection of a power converter provided in a power supply device of a vehicle according to an embodiment of the disclosure.

FIG. 5 is a control flowchart illustrating a power control device for determining a disconnection of a power converter provided in a power supply device of a vehicle according to an embodiment of the disclosure.

The power control device monitors the power converter 131 using the third distributor 132c (201). In this case, the power control device may monitor at least one of voltage, current, and power of the power converter 131.

The power control device may determine whether the first power line P1 is disconnected based on the monitoring information of the power converter 131. Herein, the first power line P1 is a power line connecting the power converter 131 and the first distributor 132a.

The power control device determines whether the operating state of the power converter 131 is in the normal state based on the monitoring information of the power converter 131 (202). In response to the operating state of the power converter 131 not being in the normal state (No in 202), the power control device determines whether there is power consumption in the power converter 131 (203), and in response to power not being consumed (No in 203), the power control device determines that the disconnection has occurred in the power converter 131 (204).

Determining that the disconnection has occurred in the power converter 131 is to determine that the power line connecting the power converter 131 and the first distributor 132a is disconnected, which includes determining that the first power line P1 is disconnected.

In response to the operating state of the power converter 131 being in the normal state (Yes in 202), the power control device may determine that the power line of the power converter 131, that is, the first power line P1 is in the normal state.

Determining whether the operating state of the power converter 131 is in the normal state may include determining whether the voltage value of the power converter 131 falls within the first reference voltage range, may include determining whether the current value of the power converter falls within the reference current range, may further include determining whether it is within a range, and may include determining whether the magnitude of noise of the power converter falls within the reference range.

Upon determining that power is consumed by the power converter 131 (Yes in 203), the power control device may determine that the first power line P1 is in the normal state.

In other words, the power control device may detect the power value consumed by the power converter 131 and determine that the first power line P1 is in the normal state in response to the detected power value being greater than or equal to the reference power value.

Upon determining that the first power line P1 is disconnected, the power control device may transmit the disconnection information of the first power line to the autonomous driving control device 70 (205).

In other words, the power control device may transmit the disconnection information of the power line connecting the power converter 131 and the first distributor 132a to the autonomous driving control device 70.

The power control device may directly receive the disconnection information of the first power line P1 from the power converter 131.

Figure 6:
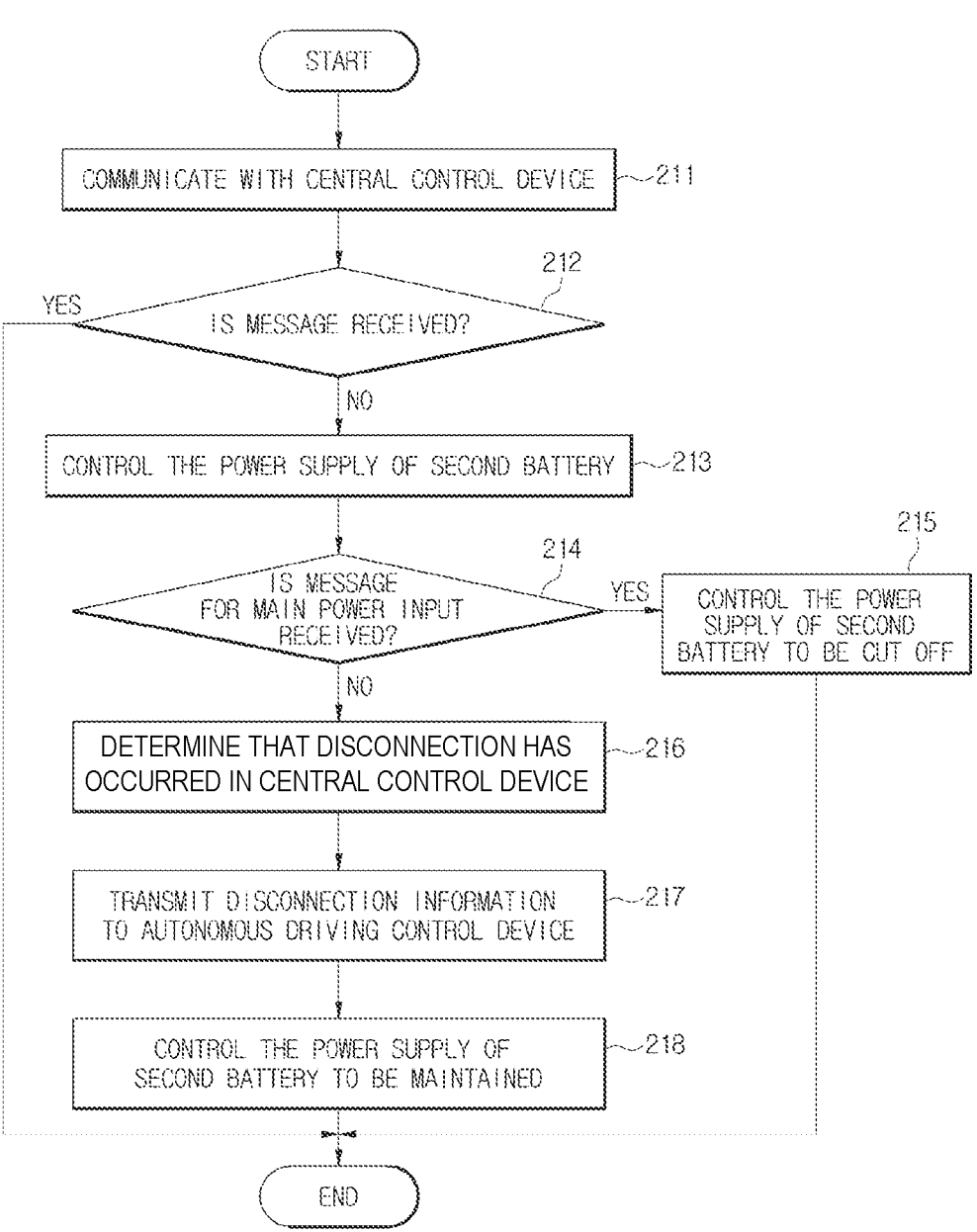
FIG. 6 is a control flowchart illustrating a power control device for determining disconnection of a central control device provided in a power supply device of a vehicle according to an embodiment of the disclosure.

FIG. 6 is a control flowchart illustrating a power control device for determining a disconnection of a central control device provided in a power supply device of a vehicle according to an embodiment of the disclosure.

The power control device communicates with the central control device 133 through the third distributor 132C (211).

The power control device determines whether a message is received from the central control device 133 (212), and upon determining that no message is received (No in 212), turns on the switch to allow power of the second battery 120 to be supplied to the central control device 133 (213).

The power control device determines whether the message for main power input is received from the central control device 133 while the second battery 120 is supplying power to the central control device 133 (214).

Upon determining that the message for main power input is received (Yes in 214), the power control device determines that the power line connecting the central control device 133 and the first distributor 132a is in the normal state.

In other words, the power control device determines that the second power line is in the normal state and turns off the switch to allow power supply of the second battery 120 to be cut off (215).

Upon determining that the message for main power non-input is received (No in 214), the power control device determines that the disconnection has occurred in the central control device 133 (216).

In other words, the power control device determines that the disconnection has occurred in the second power line P2 connecting the central control device 133 and the first distributor 132a.

The power control device transmits the disconnection information of the second power line to the autonomous driving control device 70 (217).

The message for main power input is a message for normal voltage of main power, and the message for main power non-input is a message for abnormal voltage of main power.

When the central control device 133 is disconnected, the power control device may maintain and control the turning-on of the switch to maintain the power supply of the second battery 120 to the central control device 133 (218).

Figure 7:
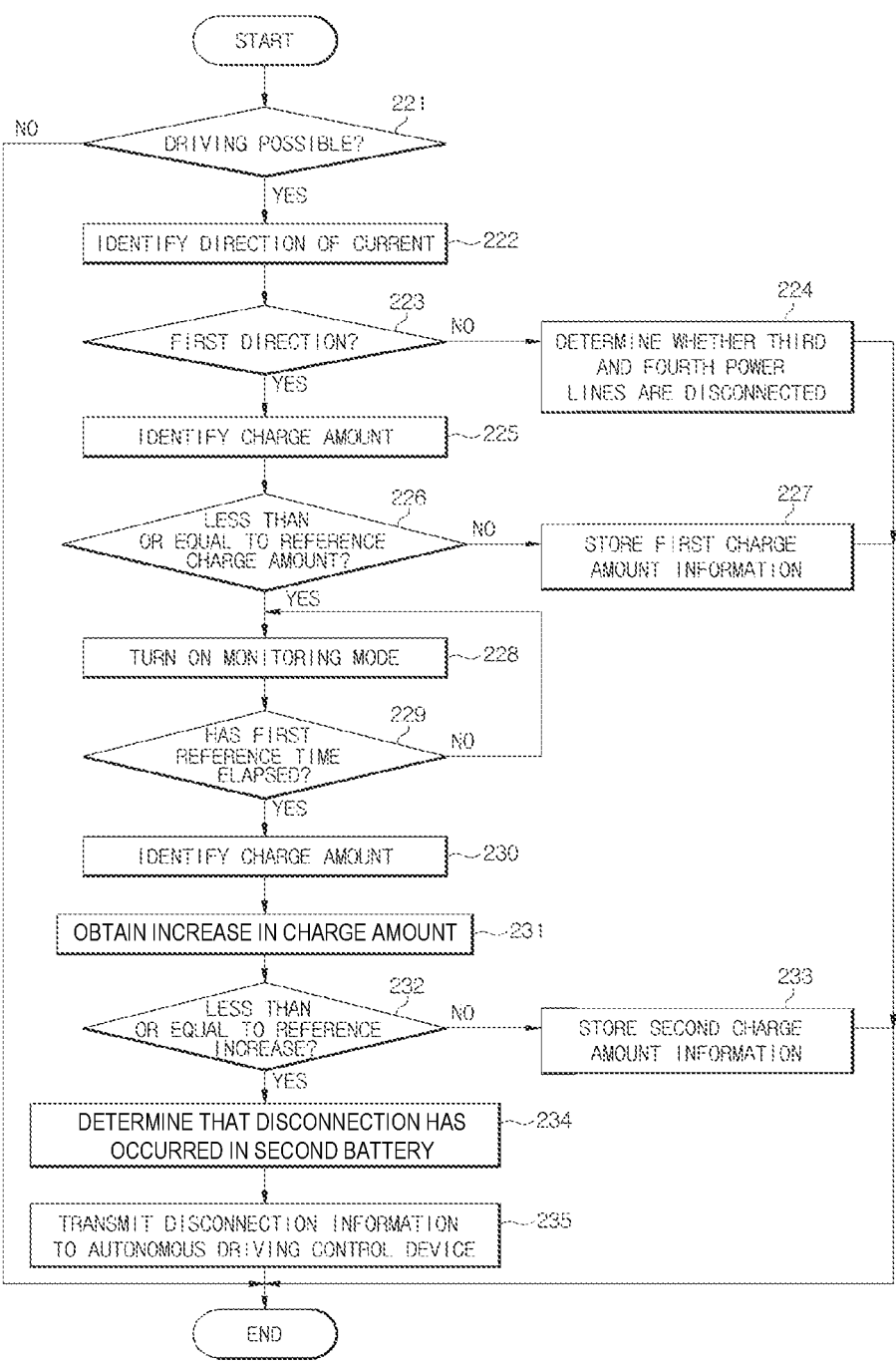
FIG. 7 is a control flowchart illustrating a power control device for determining disconnection of a second battery provided in a power supply device of a vehicle according to an embodiment of the disclosure.

FIG. 7 is a control flowchart illustrating a power control device for determining a disconnection of a second battery provided in a power supply device of a vehicle according to an embodiment of the disclosure.

The power control device determines whether the vehicle is on (e.g., EV Ready) and is ready to drive (221).

In response to driving of the vehicle being possible (Yes in 221), the power control device identifies the direction of current between the second distributor 132b and the second battery 120 (222) and determines whether the direction of current is the first direction (223). Herein, the first direction is the forward direction, which is a direction in which current flows from the second distributor 132b to the second battery 120.

The power control device may determine the operating mode of the second battery as the charging mode in response to the direction of current being the first direction.

The power control device may determine whether the monitoring mode for the second battery is off in response to the direction of current being the second direction and switch the monitoring mode for the second battery to on in response to the monitoring mode for the second battery being off.

In response to the direction of current being the second direction (No in 223), the power control device determines whether the third and fourth power lines are disconnected (224). This will be described with reference to FIG. 8A and FIG. 8B.

In response to the direction of current being the first direction (Yes in 223), the power control device receives the monitoring information from the battery management device 134 and identifies the charge amount of the second battery based on the received monitoring information of the second battery (225).

The power control device determines whether the identified charge amount is less than or equal to the reference charge amount (226). In response to the identified charge amount exceeding the reference charge amount (No in 226), the power control device determines that the power line of the second battery is in the normal state and stores the identified charge amount of the second battery as the first charge amount information (227).

In other words, the power control device may determine that the fifth power line connecting the third distributor and the second battery is in the normal state.

In response to the identified charge amount being less than or equal to the reference charge amount (Yes in 226), the power control device turns on the monitoring mode for the second battery (228).

The power control device counts the monitoring time corresponding to the on state of the monitoring mode and determines whether the first reference time has elapsed (229).

Upon determining that the first reference time has elapsed (Yes in 229), the power control device identifies the charge amount of the second battery (230).

The power control device obtains the increase in the charge amount of the second battery before and after the on state of the monitoring mode (231).

The power control device determines whether the obtained increase in the charge amount is less than or equal to the reference increase (232). In response to the obtained increase in the charge amount exceeding the reference increase (No in 232), the power control device determines that the power line of the second battery is in the normal state and stores the charge amount of the second battery as the second charge amount information (233).

Upon determining that the obtained increase in the charge amount is less than or equal to the reference increase (Yes in 232), the power control device may determine that the disconnection has occurred in the second battery (234). In other words, the power control device may determine that the fifth power line P5, which is the power line of the second battery, is disconnected and transmit the disconnection information of the fifth power line P5 to the autonomous driving control device 70 (235).

Upon determining that the obtained increase in the charge amount exceeds the reference increase, the power control device may turn off the monitoring mode of the second battery.

Upon determining that the charge amount of the second battery exceeds the reference charge based on the first charge amount information, the power control device may turn off the monitoring mode of the second battery.

Figure 8A:
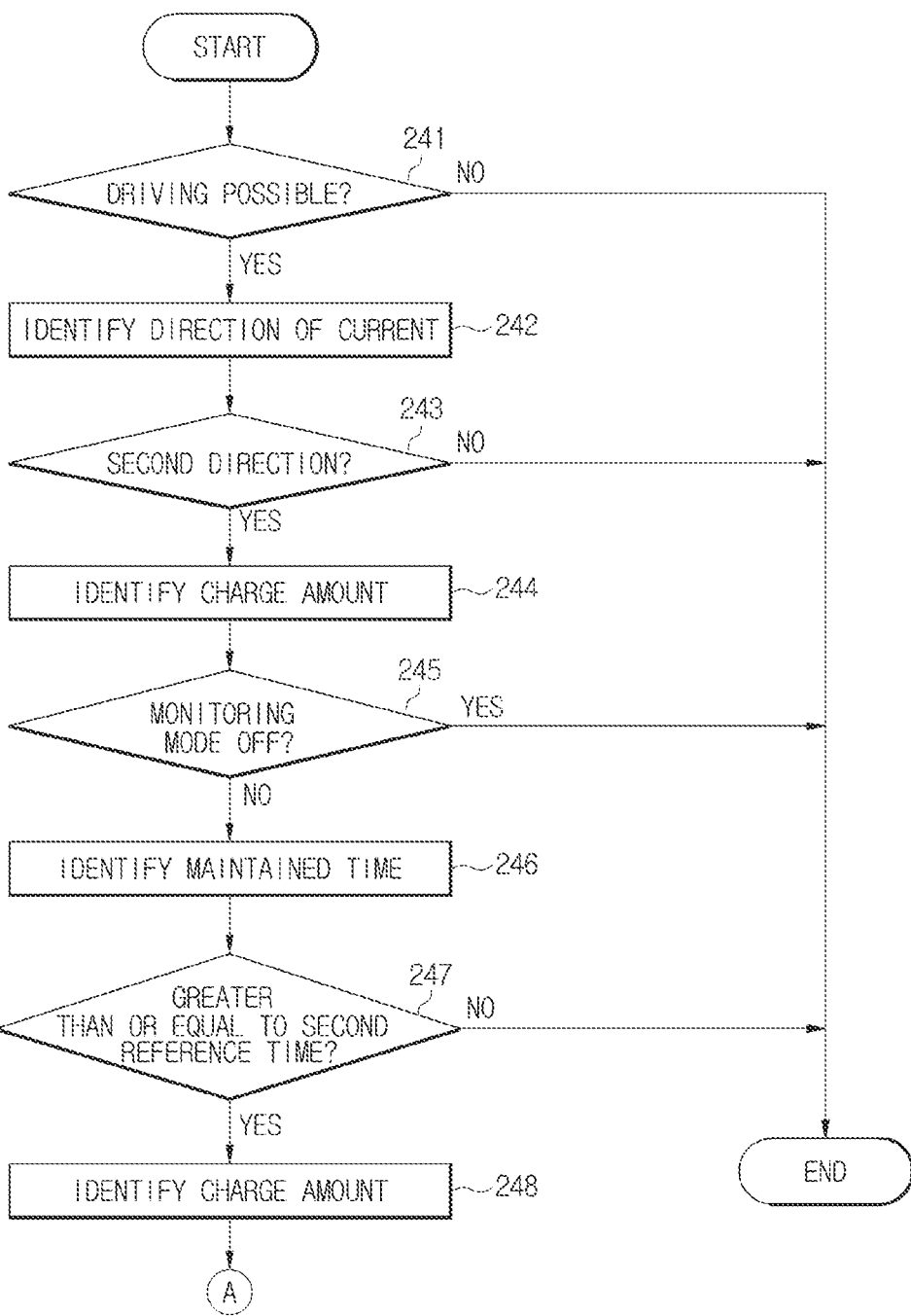
FIGS. 8A and 8B are control flowcharts illustrating a power control device for determining disconnection of a power line between first, second, and third distributors provided in a vehicle power supply device according to an embodiment of the disclosure.
Figure 8B:
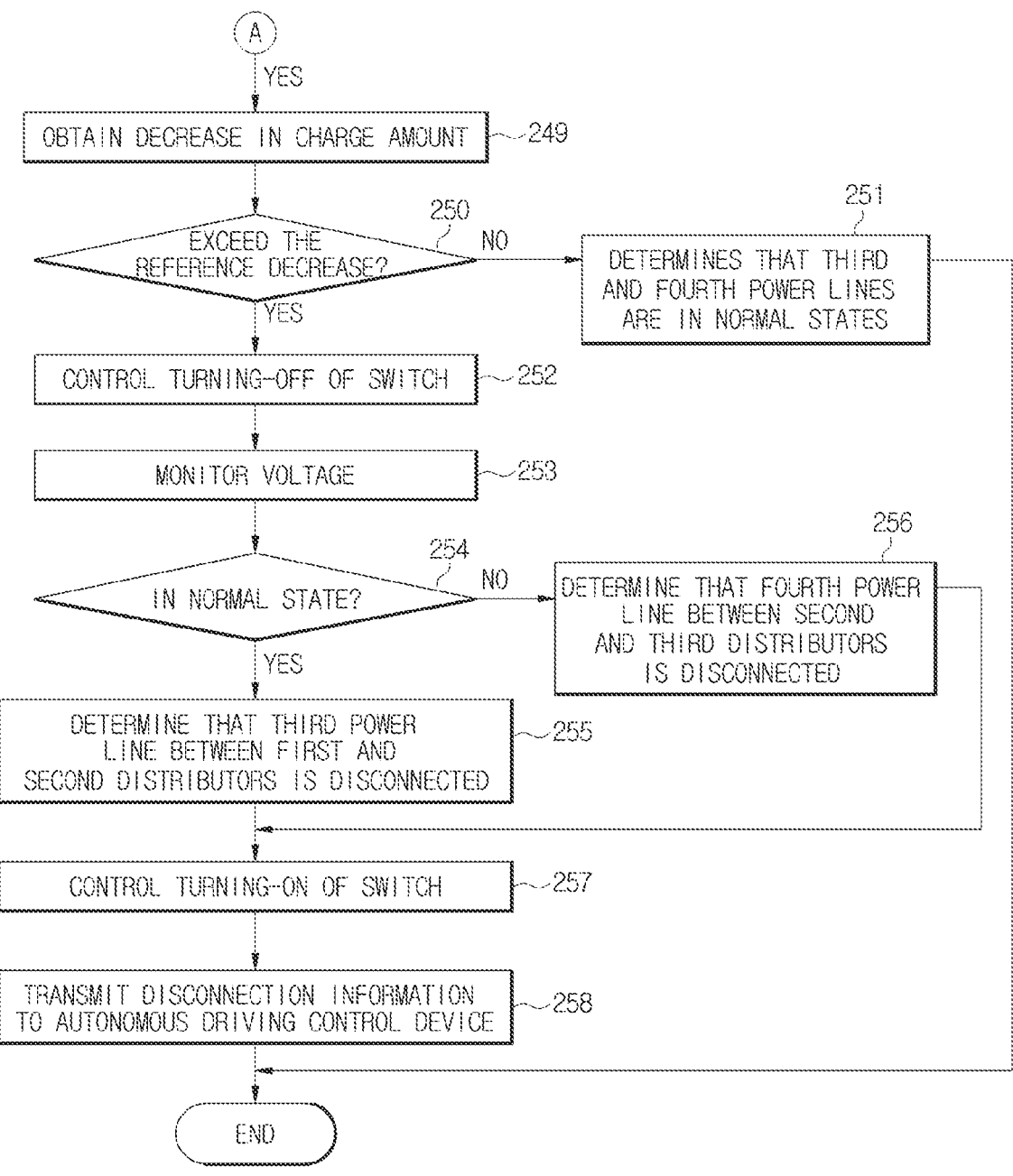

FIG. 8A and FIG. 8B are control flowcharts illustrating a power control device for determining a disconnection of power lines between first, second, and third distributors provided in a vehicle power supply device according to an embodiment of the disclosure.

The power control device determines whether the vehicle is on (e.g., EV Ready) and is ready to drive (241).

Upon determining that the switch Sb is turned on (Yes in 241), the power control device identifies the direction of current between the second distributor 132b and the second battery 120 (242) and determines whether the direction of current is the second direction (243). Herein, the second direction is the reverse direction, in which current flows from the second battery 120 to the second distributor 132b.

Upon determining that the direction of current is the second direction (Yes in 243), the power control device may determine that the operating mode of the second battery is the discharging mode.

Upon determining that the direction of current is the second direction, the power control device first identifies the charge amount of the second battery (244).

The power control device determines whether the monitoring mode for the second battery is off (245), and in response to the monitoring mode not being off (No in 245), identifies the time the direction of current has been maintained in the second direction (246).

The power control device may switch the monitoring mode to the on state upon determining that the monitoring mode is off.

In other words, the power control device may identify the time the direction of current has been maintained in the second direction by counting the time the direction of current has been maintained in the second direction while the monitoring mode is the on state.

The power control device determines whether the counted time is greater than or equal to the second reference time (247), and upon determining that the counted time is greater than or equal to the second reference time (Yes in 247), secondarily identifies the charge amount of the second battery (248).

The power control device may switch the monitoring mode to the off state in response to the time for which the direction of current has been maintained in the second direction is less than the second reference time.

The power control device obtains the decrease in the charge amount of the second battery by obtaining the difference between the charge amount of the second battery, which is firstly confirmed, and the charge amount of the second battery, which is secondarily confirmed (249), and then determines whether the obtained decrease exceeds the reference decrease (250).

In response to the decrease in the charge amount of the second battery being less than or equal to the reference decrease (No in 250), the power control device determines that the third and fourth power lines are in the normal states (251).

Upon determining that the decrease in the charge amount of the second battery exceeds the reference decrease (Yes in 250), the power control device controls the turning-off of the switch Sb (252) and monitors the voltage input to the third distributor 132C (253).

The power control device determines whether the voltage input to the third distributor 132c is in the normal state (254).

Determining whether the voltage input to the third distributor 132c is in the normal state may include determining whether the voltage input to the third distributor 132c falls within the second reference voltage range.

Determining whether the voltage input to the third distributor 132c is in the normal state may include determining whether the voltage of the second distributor 132b falls within the second reference voltage range.

In response to the voltage input to the third distributor 132c being in the normal state (Yes in 254), the power control device may determine that the third power line P3, which is the power line between the first and second distributors, is disconnected (255). In addition, in response to the voltage input to the third distributor 132c being in the abnormal state (No in 254), the power control device may determine that the fourth power line P4, which is the power line between the second and third distributors, is disconnected (256).

Determining that the voltage input to the third distributor 132c is in the abnormal state may include determining that the voltage input to the third distributor 132c is out of the second reference voltage range.

Determining that the voltage input to the third distributor 132c is in the abnormal state may include determining that the voltage of the second distributor 132b is out of the second reference voltage range.

The power control device may also determine whether the third and fourth power lines are disconnected by confirming the current flowing through the second distributor 132b. In other words, the power control device may determine that the fourth power line is disconnected in response to the current flowing through the second distributor 132b exceeding the reference current and determine that the third power line is disconnected in response to the current flowing through the second distributor 132b being less than or equal to the reference current.

The power control device may control the turning-on of the switch Sb upon determining that third power line P3 or the fourth power line P4 is disconnected (257) and transmit the disconnection information of the third power line P3 or the disconnection information of the fourth power line P4 to the autonomous driving control device 70 (258).

As is apparent from the above, various embodiments of the disclosure may supply power to the steering device, the braking device, the one or more sensors, and the autonomous driving control device in a dual manner, so that the power may be supplied to the steering device, the braking device, the one or more sensors, and the autonomous driving control device even if any one of the power lines is disconnected. Accordingly, embodiments of the present disclosure may improve safety of autonomous driving.

Furthermore, various embodiments of the disclosure may easily and quickly recognize a disconnection (i.e., open) of at least one of the plurality of power lines through monitoring of a power supply device while driving.

Furthermore, various embodiments of the disclosure may take over the control right of the vehicle to the user in response to at least one power line being disconnected during autonomous driving control, thereby preventing a vehicle accident.

Furthermore, various embodiments of the disclosure may supply the power of the second battery to the central control device in response to the disconnection occurring in the central control device provided in the power supply device during autonomous driving control, thereby preventing communication between the power supply device and the autonomous driving control device from being cut off.

Furthermore, various embodiments of the disclosure may improve the power supply device, the power control device, and the quality of the vehicle having the same, and moreover increase a user's satisfaction and improve a user's convenience.

On the other hand, the exemplary embodiments of the disclosure may be embodied in the form of a recording medium storing instructions executable by a computer. The instructions may be stored in the form of program code and, when executed by a processor, may generate a program module to perform the operations of the exemplary embodiments. The recording medium may be embodied as a non-transitory computer-readable recording medium.

The non-transitory computer-readable recording medium includes all types of recording media in which instructions which may be decoded by a computer are stored, for example, a Read Only Memory (ROM), a Random Access Memory (RAM), a magnetic tape, a magnetic disk, a flash memory, an optical data storage device, and the like.

Although exemplary embodiments of the disclosure have been described for illustrative purposes, those skilled in the art will appreciate that various modifications, additions, and substitutions are possible, without departing from the scope and spirit of the disclosure. Therefore, exemplary embodiments of the present disclosure have not been described for limiting purposes.

What is claimed is:

1. A power control apparatus comprising:
   a power converter configured to convert a voltage supplied from a first battery into a voltage lower than the voltage supplied from the first battery;
   a power distributor configured to distribute power supplied from the power converter and supply the distributed power to a braking device, a steering device, a sensor, and an autonomous driving control device in duplicate; and
   a battery management device configured to control a charging of a second battery using the power supplied from the power distributor;
   wherein the power distributor is further configured to:
      monitor information related to at least one of power, voltage, and current of the power converter;
      determine whether a power line between the power converter and the power distributor is disconnected based on the monitored information; and
      in response to a determination that the power line between the power converter and the power distributor is disconnected, transmit disconnection information on the power line between the power converter and the power distributor to the autonomous driving control device.

2. The power control apparatus of claim 1, further comprising a central control device configured to receive power from the power distributor and communicate with the power converter, the autonomous driving control device, and the power distributor, wherein the power distributor is further configured to control the second battery to supply the power of the second battery to the central control device in response to a message not being received from the central control device.

3. The power control apparatus of claim 2, wherein, while the power of the second battery is being supplied to the central control device, the power distributor is further configured to control the second battery to cut off the power supply of the second battery in response to a message for power input of the power converter being received from the central control device.

4. The power control apparatus of claim 3, wherein the power distributor is further configured to:

in response to a message for power non-input of the power converter being received, determine that a disconnection has occurred in a power line between the power converter and the central control device; and transmit disconnection information regarding the power line between the power converter and the central control device to the autonomous driving control device.

5. The power control apparatus of claim 1, wherein the power distributor further comprises:

a first distributor connected to the power converter;

a second distributor connected to the first distributor and configured to supply the power to the braking device, the steering device, the sensor, and the autonomous driving control device; and a third distributor connected to the second distributor and configured to supply the power to the braking device, the steering device, the sensor, and the autonomous driving control device.

6. The power control apparatus of claim 5, wherein:

the second distributor is configured to supply the power to an emergency braking control device of the braking device; and the third distributor is configured to supply the power to a parking brake control device of the braking device.

7. The power control apparatus of claim 5, further comprising a central control device configured to receive the power from the first distributor or the second battery and communicate with the power converter, the autonomous driving control device, the second distributor, and the third distributor, wherein the third distributor is further configured to:

monitor the power converter, the second distributor, and the third distributor;

determine whether a power line of a plurality of power lines connected between the power converter and the first, second, and third distributors is disconnected based on the monitored information regarding the power converter, the second distributor, and the third distributor; and in response to a determination that the power line is disconnected, transmit disconnection information to the autonomous driving control device.

8. The power control apparatus of claim 7, wherein the third distributor further comprises a switch connected to the second battery, and wherein the third distributor is further configured to:

control turning-off of the switch upon determining that the second battery is in a discharging mode; and determine whether a power line between the first distributor and the second distributor or a power line between the second distributor and the third distributor is disconnected based on the monitored information on the second distributor.

9. The power control apparatus of claim 7, wherein the third distributor is further configured to:

in response to a message not being received from the central control device, control the second battery to supply the power of the second battery to the central control device;

in response to a message for power input of the power converter being received from the central control device while the power of the second battery is being supplied to the central control device, control the second battery to cut off the power supply of the second battery; and in response to a message for power non-input of the power converter being received, control the second battery to maintain the power supply of the second battery.

10. The power control apparatus of claim 7, wherein the third distributor is further configured to:

monitor a state of charge of the second battery; and determine whether a power line between the second battery and the third distributor is disconnected based on the state of charge of the second battery.

11. A vehicle comprising:

a braking device;

a steering device;

a sensor;

an autonomous driving control device configured to control the braking device or the steering device based on information detected by the sensor; and a power supply device comprising a first battery, a second battery configured to output a voltage lower than a voltage of the first battery, and a power control device configured to convert and distribute the voltage of the first battery and configured to supply power from the converted and distributed voltage to the braking device, the steering device, the sensor, and the autonomous driving control device in duplicate, wherein the power control device comprises:

a power converter configured to convert the voltage supplied from the first battery into the voltage lower than the voltage of the first battery; and a power distributor configured to distribute power supplied from the power converter and supply the distributed power to the braking device, the steering device, the sensor, and the autonomous driving control device in duplicate, and wherein the power distributor is further configured to:

monitor information related to at least one of power, voltage, and current of the power converter;

determine whether a power line between the power converter and the power distributor is disconnected based on the monitored information; and in response to a determination that the power line between the power converter and the power distributor is disconnected, transmit disconnection information on the power line between the power converter and the power distributor to the autonomous driving control device.

12. The vehicle of claim 11, wherein the power control device further comprises:

a central control device configured to receive the power from the power distributor and communicate with the power converter, the autonomous driving control device, and the power distributor; and a battery management device configured to control a charging of the second battery using the power supplied from the power distributor.

13. The vehicle of claim 12, wherein the power distributor further comprises:

a first distributor connected to the power converter;

a second distributor connected to the first distributor and configured to supply the power to the braking device, the steering device, the sensor, and the autonomous driving control device; and a third distributor connected to the second distributor and configured to supply the power to the braking device, the steering device, the sensor, and the autonomous driving control device.

14. The vehicle of claim 13, wherein the third distributor is configured to:

monitor at least one of power, voltage, and current of the power converter;

determine whether a power line between the power converter and the first distributor is disconnected based on the monitored information; and in response to a determination that the power line between the power converter and the first distributor is disconnected, transmit disconnection information on the power line between the power converter and the first distributor to the autonomous driving control device.

15. The vehicle of claim 13, wherein the third distributor further comprises a switch connected to the second battery, and wherein the third distributor is further configured to:

control turning-off of the switch in response to a determination that the second battery is in a discharging mode; and determine whether a power line between the first distributor and the second distributor or a power line between the second distributor and the third distributor is disconnected based on monitored information related to the second distributor.

16. The vehicle of claim 13, wherein the third distributor is further configured to:

in response to a message not being received from the central control device, control the second battery to supply the power of the second battery to the central control device;

in response to a message for power input of the power converter being received from the central control device while the power of the second battery is being supplied supplying to the central control device, control the second battery to cut off the power supply of the second battery; and in response to a message for power non-input of the power converter being received, control the second battery to maintain the power supply of the second battery.

17. The vehicle of claim 16, wherein in response to the message for power non-input of the power converter being received, the third distributor is further configured to transmit disconnection information on a power line between the first distributor and the central control device to the autonomous driving control device.

18. The vehicle of claim 13, wherein the third distributor is further configured to:

monitor a state of charge of the second battery in response to the second battery being in a charging mode;

determine whether a power line between the second battery and the third distributor is disconnected based on the state of charge of the second battery; and determine the charging mode based on a direction of current of the second battery.

19. The vehicle of claim 13, wherein the braking device comprises an emergency braking control device configured to receive the power from the second distributor and a parking brake control device configured to receive the power from the third distributor.

20. A power control apparatus comprising:

a power converter configured to convert a voltage supplied from a first battery into a voltage lower than the voltage supplied from the first battery;

a power distributor comprising a first distributor connected to the power converter, a second distributor connected to the first distributor and configured to supply power to a braking device, a steering device, a sensor, and an autonomous driving control device, and a third distributor connected to the second distributor and configured to supply the power to the braking device, the steering device, the sensor, and the autonomous driving control device; and a battery management device configured to control a charging of a second battery using the power supplied from the power distributor.

* * * * *